G. E. DUNTON.
METHOD FOR APPLYING A CONDUCTIVE COATING TO THE SURFACE OF A MOLD USED IN THE ART OF ELECTROTYPING.
APPLICATION FILED JAN. 18, 1913.
1,111,443.
Patented Sept. 22, 1914.
4 SHEETS—SHEET 2.
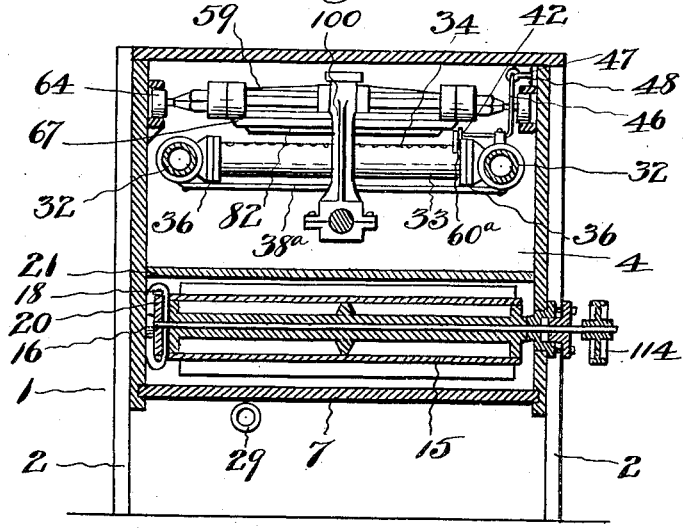
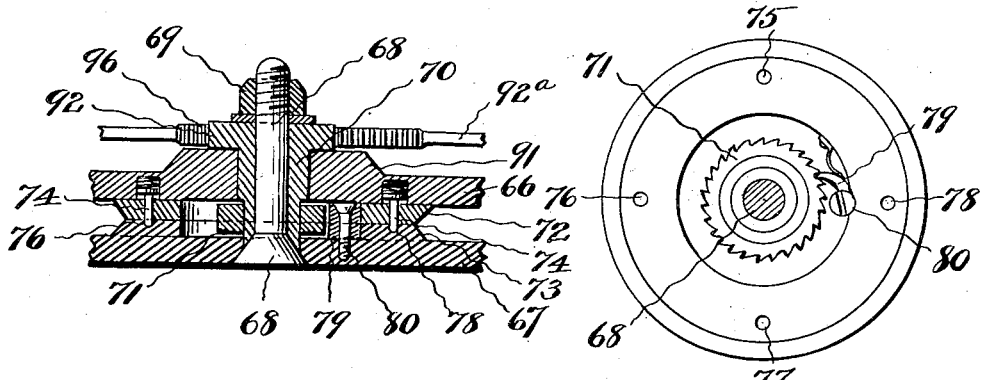

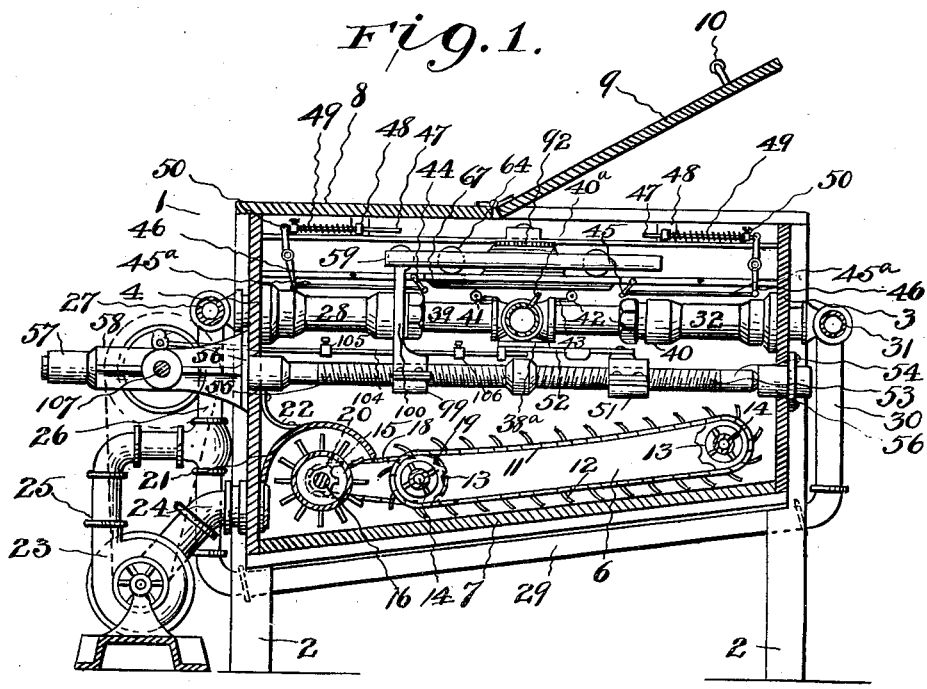

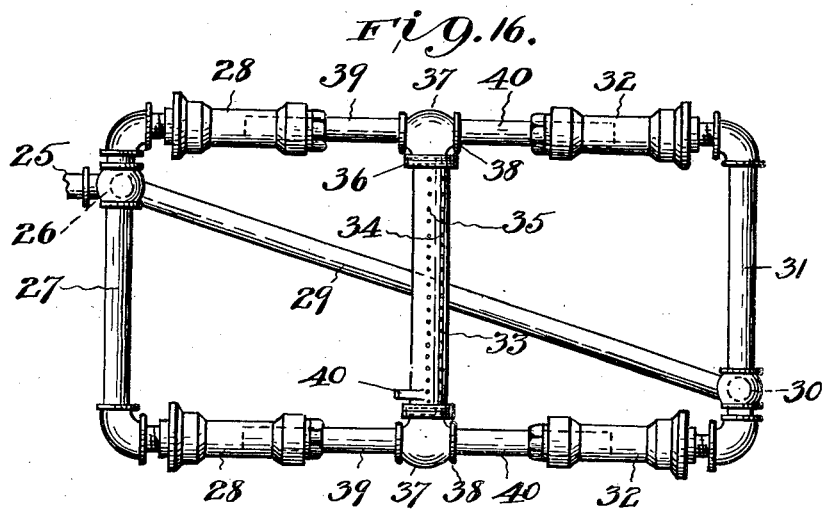
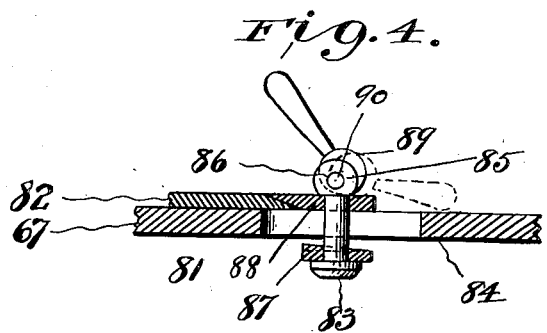
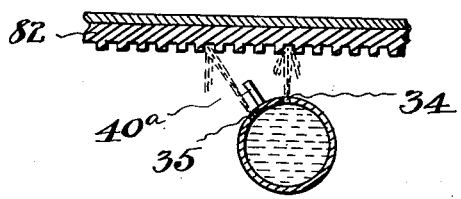
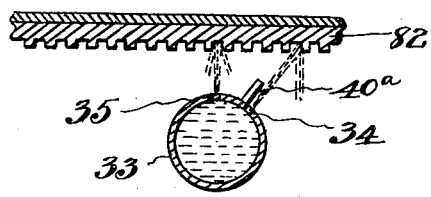

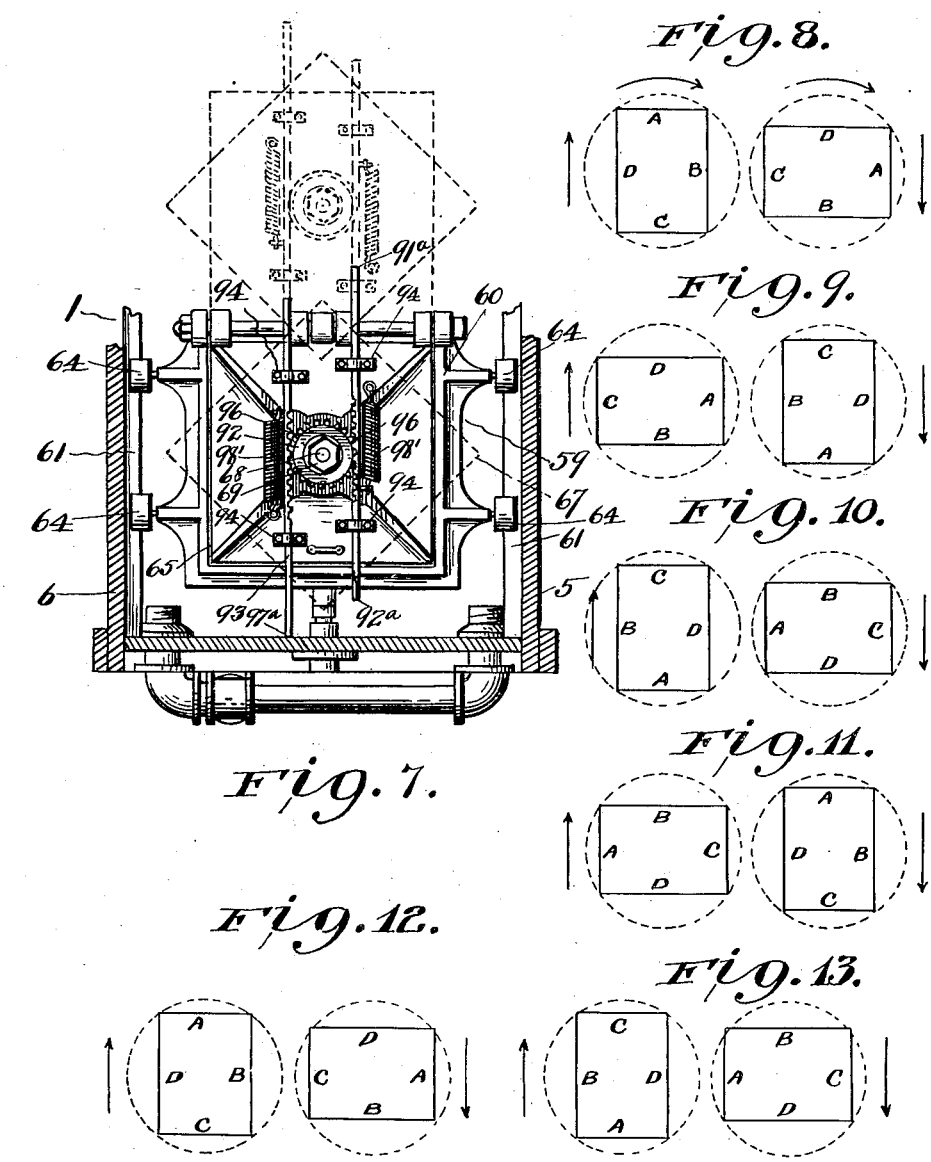

UNITED STATES PATENT OFFICE.

GEORGE E. DUNTON, OF NEW YORK, N. Y.

METHOD FOR APPLYING A CONDUCTIVE COATING TO THE SURFACE OF A MOLD USED IN THE ART OF ELECTROTYPING.

1,111,443. Specification of Letters Patent. Patented Sept. 22, 1914.

Application filed January 18, 1913. Serial No. 742,868.

*To all whom it may concern:*

Be it known that I, GEORGE E. DUNTON, residing at New York city, county of New York, State of New York, a citizen of the United States, have invented a certain new and useful Improvement in Methods for Applying a Conductive Coating to the Surface of a Mold Used in the Art of Electrotyping; and I do hereby declare the following to be a full, clear, and exact description of the invention, such as will enable others skilled in the art to which it pertains to make and use the same.

My invention relates to improvements in method for applying a conductive coating to the surface of a mold used in the art of electrotyping.

In producing printing plates by the electrotype process the wax mold is made by pouring melted wax or other suitable molding material over thin sheets of metal and allowing the wax to cool and after becoming sufficiently hard the surface of the mold is shaved off until it presents a perfectly smooth even surface when the form containing the impression of the printing plate, desired to be produced, is pressed into this surface, the form removed and the mold trimmed by means of a heated knife which removes the more elevated portions and gives uniformity to the indentations which in the plate will be the reverse of the elevations in the mold, and any grease, oil or oily substance which may have been expressed from the mold, by the pressure of the form, is also removed.

A coating of conductive material, such as graphite, mixed with a suitable liquid medium is then applied to the mold surface in order that it shall become conductive to electricity and exercise the function of the cathode element in the electrolytic bath wherein it is to receive the predetermined deposit of metal. Prior to its immersion in the electrolytic bath, and following the administration of the conductive coating, the mold is treated to a preliminary coating or to a deposit of copper or other suitable metal through the agency of or by chemical means, the mold is then thoroughly rinsed or washed off, with a powerful spray or jets of water, and the surface is flowed with a solution of sulfate of copper, fine iron dust is sprinkled over the surface of the copper solution which is gently agitated by means of a suitable brush, and by the chemical action which follows the iron enters into the solution in the form of a sulfate and the copper is displaced appearing as a precipitate of the metal on the conductive coated surface of the mold, the mold is then rinsed off with water and hung in the plating bath to receive the desired deposit of metal and when this deposit of metal becomes of the desired thickness the mold is removed from the bath and the shell stripped off from the same after which it receives the proper backing and is finished for the printing machine upon which it is desired to be used.

It is not necessary to describe the subsequent operations which follow the deposition of the electrotype shell, as my invention relates particularly to a method for the treatment of the surface of the mold with the conductive coating prior to the deposition of the metal in the electrolytic bath.

As the degree of perfection of the printing surface of the electrotype plate depends on the manner in which the conductive coating is applied to the surface of the mold it is of the utmost importance that the coating should be applied and distributed smoothly and evenly and made to absolutely cover the entire surface of the mold and all the indentations therein or projections thereon and not leave any portions of the same uncovered or any imperfections.

The object of my invention is to provide a method by which the conductive coating will be applied evenly and smoothly to the entire surface preferably of an inverted mold and the indentations, projections, &c., in or on its surface and thereby provide for the production of a perfect printing surface on the electrotype plate produced therefrom.

A further object is to provide a method for applying the conductive coating to a mold, preferably having a surface provided with indentations, but which may have projections on its surface or any other character of surface and which can be flat, curved or any other desired shape or contour.

A further object is to provide a method for applying a conductive coating to the surface of a mold by applying a conductive coating to the surface of a mold and to the indentations in its surface by projecting the said conductive coating into the indentations and onto the surface of the mold simultaneously at different angles.

A further object is to provide a method for applying a conductive coating to the surface of a mold and to the indentations in its surface by projecting the said conductive coating into the indentations at different angles before the conductive coating drops, by force of gravity, from the surface of the mold.

A further object is to provide a method for applying a conductive coating to the inverted mold, above the surface of the body of the conductive coating in the receptacle containing the same.

A further object is to provide a method for applying a conductive coating to the indentations in a mold and presenting different portions of said indentations to the action of the conductive coating.

A final object is to provide a method for the purpose set forth which is simple, inexpensive and accomplishes the desired result easily and perfectly.

My method of procedure is as follows:—
I prepare a conductive coating, preferably of graphite mixed with water until it is of the consistency of paste, cream or syrup, and place it in a suitable tank or other receptacle in which a reciprocatable and rotatable mold supporting means, a reciprocatable and rotatable perforated conductive coating projecting means and a mixing means for the conductive coating has been installed and operatively connect each of said means with a suitable motive power, and provide a pump or other forcing means and a series of pipes, which form a communication between the tank or receptacle and the conductive coating projecting means, I then place and secure a mold, face downward, or reversed, on the mold supporting means and start the same to reciprocating and the mold to rotating step by step, about one quarter of a revolution at each step, until it has been entirely revolved and all sides of the same have been presented successively to the action of the conductive coating, and while this has been taking place the projecting means has been reciprocating, in the opposite direction from the mold and the pump has been withdrawing the conductive coating from the tank and supplying it through the system of pipes to the projecting means and projecting it through the perforations therein, at different angles, simultaneously onto the sides and bottoms of the indentations of the mold and onto its surface until the entire surfaces of the same have been completely covered with the conductive coating. The amount of force with which the conductive coating is applied to the mold, simultaneously, burnishes and polishes the coating which has adhered to the same and removes the surplus coating that does not adhere to the mold and it falls back into the tank, by gravity, and is fed to the mixer and used over again.

Referring to the drawings which illustrate one form of apparatus for carrying out my method:—Figure 1 is a longitudinal sectional view partly in elevation. Fig. 2 is a top plan view partly in section. Fig. 3 is a sectional end view partly in elevation. Fig. 4 is a detail sectional view of one of the mold clamping devices. Fig. 5 is a fragmentary sectional view of the mold turn table and its operating mechanism. Fig. 6 is a top plan view of the pawl and ratchet device of the mold turn table. Fig. 7 a fragmentary plan view showing the mold carriage, turn table and operating parts. Figs. 8 to 13 inclusive are diagrammatic views showing the various positions which the molds assume in applying the conductive coating. Fig. 14 a fragmentary sectional view of the mold and the conductive coating projecting and distributing means, said projecting and distributing means being shown in its rearward position. Fig. 15 a similar view to Fig. 14 showing the projecting and distributing means in its forward position. Fig. 16 a detail plan view of the rotatable and reciprocatory cylinder, T-heads and guides.

In the drawings in which like reference characters denote like parts throughout the several views, 1 represents a suitable tank, receptacle or container for the conductive coating of graphite of my apparatus, made preferably of wood lined with sheet metal but which may be made of any other suitable material, which is supported by means of legs 2 and provided with front and rear end walls 3 and 4, respectively, side walls 5 and 6, a bottom 7 slanting downward to the rear wall 4, and a top 8 having a hinged cover 9 with any suitable catch to keep it closed and a handle 10.

The means for scraping up any graphite or other conductive coating which precipitates to the bottom of the tank, and mixing the graphite and feeding it to the mixing means; comprises an endless sprocket chain conveyer 11 having a series of scrapers 12, preferably made of heavy sheet rubber, and mounted on the sprocket wheels 13 on shafts 14 which extend transversely across the tank 1 and have their ends mounted in suitable bearings in the side walls 5 and 6 thereof, 15 being a mixing drum or cylinder mounted on shaft 16 extending transversely across the tank 1 and having its ends mounted in bearings in the side walls 5 and 6 of said tank and its front end extending through the side 6 of the tank, and 18 a sprocket chain operatively connecting sprocket 19 on shaft 14 of the conveyer 11 with sprocket 20 on the shaft 16 of the mixing drum or cylinder.

The upper portion of the mixing drum or cylinder is inclosed by a curved cover 21 which extends across the tank transversely, and is secured to the rear end wall 4 thereof by means of brackets 22.

The means for withdrawing or exhausting the conductive coating of graphite or other suitable material circulating through the same and projecting it against the mold comprises a pump 23, preferably of the rotary turbine type but may be any suitable liquid forcing device which will accomplish the desired results in a satisfactory manner.

The pump 23 is connected to and communicates with the tank 1 by means of a short curved pipe 24 by which the conductive coating is withdrawn or exhausted from said tank, and the outlet pipe 25 of the pump is connected to a vertical pipe 26, the upper end of which connects with a horizontal pipe 27, the opposite ends of which are connected to short horizontal pipes 28 which pass through the upper portion of the rear wall 4 into the tank while the lower end of the pipe 26 is connected to a pipe 29 which extends diagonally under the bottom of the tank and connects with a vertical pipe 30 rising in front of the tank and said pipe 30 connects with a horizontal pipe 31 the opposite ends of which are connected to short horizontal pipes 32 which pass through the upper portion of the front wall 3 into the tank.

The conductive coating or graphite projector consists of a rotatable cylinder or barrel 33 having a double row of holes 34 and 35 through which the conductive coating is forced as it is projected against the surface of the mold, said holes being preferably spaced apart at an angle of 45°, but they may be spaced apart at any desired angle and said cylinder or barrel being pivotally mounted in the bearings 36 in the T-shaped castings 37 on each side of the slidable frame 38, said castings being connected by means of a bar 38ª secured to the under portions of the same and each having hollow guides 39 and 40 projecting therefrom which are slidably mounted in the short horizontal pipes 28 and 32, respectively. Suitable packing is provided to insure air and liquid tight joints between the hollow guides and the short horizontal pipes 28 and 32.

One end of the cylinder or barrel 33 is provided with an upwardly projecting pin or lug 40ª and rollers 41 and 42 are mounted on spring arms 43 which in turn are secured to the T-shaped casting in proximity to the side 6 of the tank 1.

44 and 45 are reversing arms pivoted to the side wall 6 of the tank, 46 being levers also pivoted to the side wall 6 of the tank, one end of each of which is connected to one of the reversing arms by means of a rod 45ª while the opposite end is connected to a rod 47 slidably mounted in a bracket 48 and provided with a spiral spring 49, which surrounds the same, for retaining said rod 45 normally in its outward position and 50 are nuts adjustable on said rods for regulating the tension of the spiral springs 49.

The rotatable cylinder or barrel 33 is rotated in one direction, viz., forwardly, by the reversing arm 45 engaging the roller 41 and then slipping off the same, under tension of the spring 49 on rod 47 at the rear of the tank, and striking the lug or lugs 40 and throwing it forwardly and the rotatable cylinder or barrel is rotated in the opposite direction, viz., rearwardly, by the reversing arm 46 engaging the roller 42 and then slipping off the same, under tension of the spiral spring 49 on rod 47 at the front of the tank, and striking the pin or lug 40ª and throwing it rearwardly.

The slidable frame 38 and the cylinder or barrel 33, pivoted therein, are reciprocated by means of an internally screw threaded sleeve 51 connected to the bar 38ª of the slidable frame 38 by means of a link 52, said sleeve being mounted and adapted to move on the right hand screw threads 53 of the driving shaft 54 which has right and left hand screw threads, 53 and 55, respectively, said shaft 54 being mounted in tubular bearings 56 in the front and rear end walls of the tank, the rear end of the shaft 54 extending through the rear end wall of the tank and being mounted in a bearing 57 formed in a bracket 58 bolted to the outer face of the said rear end wall.

The mold carriage 59 consists of an open frame 60 with axles having small wheels 64, designed to travel between the tracks 61 secured to the side walls 5 and 6 of the tank, inwardly projecting ledges 65 and a plate 66 hinged at one end thereof.

A turn table 67 is pivoted to the underside of the plate 66 by means of a screwbolt 68 having a nut 69, and 70 is a sleeve mounted on said screwbolt having a ratchet 71 secured to its lower end and 72 and 73 are annular rings placed between the plate 66 and the turn table 67, the rings 72 being securely attached to the plate 66 and the ring 73 being securely attached to the turn table. 74 are spring controlled pins mounted in the plate 66 and the annular ring 72 which engage holes or depressions, 75, 76, 77 and 78 in the annular ring 73 with which said pins are designed to register for the purpose of holding the turn table in its various positions when applying the conductive coating, and a spring controlled pawl 79 is provided which is mounted on a screw 80 secured in the turn table 67 and engages the ratchet 71 which prevents the turn table from turning backward.

Clamping devices 81, for securing the mold 82 to the turn table, are provided having bolts 83 passing through slots 84 of the turn table and having heads 85 and eyes 86, wedge shaped, washers 87 mounted on the bolts 83 below the turn table, plates 88 mounted on the bolts 83 above the turn table and resting thereon and cam or eccentric levers 89 pivoted on short shafts 90 mounted in the eyes 86.

The hinged plate 66 is provided with a central circular projection or hub 91 which surrounds the sleeve 70 and a cog wheel 92 is keyed to the sleeve 70 just above this circular projection 91.

Bars 92ª and 93 are slidably mounted in guides 94 projecting from the top of the hinged plate 66 and each is provided with a series of teeth 96 which mesh with the cog wheel 92.

When the mold carriage 59 moves to the forward end of the tank on its first trip the end 91ª of the bar 92ª will contact with the front end wall of the tank which will cause said bar to slide rearwardly and by means of the teeth 96 and cog wheel 92 the turn table 67 will be rotated to the right, one fourth of a revolution. When the mold carriage 59 moves toward the rear end of tank, the end 97ª of the bar 93 will contact with the rear end wall of the tank, which will cause the said bar to slide forwardly and by means of the teeth 96 and cog wheel 92 the turn table 67 will be again rotated to the right, another one-fourth of a revolution. The bars 92 and 93 are returned to their normal positions by means of spiral springs 98′ attached to said bars and the plate 66.

By repeating this back and forth movement, the turn table will be rotated entirely around, each time the mold carriage makes four trips, and will present all sides of the mold and the indentations therein, to the action of the stream or jet of graphite projected thereon by means of the rotatable cylinder or barrel 33.

The mold carriage is reciprocated by means of an internally screw threaded sleeve 99, mounted on the left hand screw thread 55 of the driving shaft 54 and connected to the carriage by means of an upwardly extending arm 100.

The rear end of the driving shaft 54 is provided with two beveled gears 101 and 102, rotatable freely thereon, which are provided with right and left hand projections. respectively, and a clutch sleeve 103 is slidably mounted and keyed to said shaft 54 and is provided with right and left hand projections, one end having a right hand projection and the other end having a left hand projection.

The sleeve 103 is provided with a rod 104 having adjustable stops 105 and 106 thereon and as the mold carriage 59 moves rearwardly, it engages the adjustable stop 105 which causes the sleeve 103, by means of the rod 104, to be disengaged from the bevel gear 102 and engage it with the bevel gear 101 and reverses the direction of rotation of the driving shaft and as the mold carriage moves forwardly it engages the adjustable stop 106 which causes the sleeve 103, by means of the rod 104, to be disengaged from the bevel gear 101, and engages it with the bevel gear 102 and again reverses the direction of rotation of the driving shaft.

107 is a shaft mounted in the bracket 58 and one end of which is provided with a bevel gear 108 fast thereon, which is designed to be alternately engaged by the bevel gears 101 and 102 and the opposite end is provided with a pulley 109 which is operatively connected with a pulley 110 on the pump shaft 111 by means of a belt 112.

The outer end of the pump shaft is provided with a pulley 113 and the outer end of the shaft 16 of the mixing drum is provided with a pulley 114 which is operatively connected to the pulley 113 by means of a belt 115.

A driving pulley 116 is mounted on the pump shaft 110 and is designed to be connected by means of a shaft with an engine, motor or other motive power.

The operation of the apparatus is as follows:—The mold carriage having been brought into a position at the extreme front of the tank and directly under the cover 9 thereof, the cover is opened and a sufficient quantity of graphite, previously mixed with water until it has acquired the proper consistency, such, for instance, as of paste, cream or syrup, is poured into the tank until it is about one quarter or one third full or at least deep enough to entirely submerge the endless sprocket chain conveyer 11 but not of sufficient depth to touch or submerge the driving shaft 54. The plate 66 of the mold carriage is raised to a vertical position, and the turn table being mounted thereon is also raised, a wax mold which has been preferably treated to remove any grease, oil or oily substance is then attached to the underside of the turn table by means of the clamping devices 81, the plate 66 is then lowered until it rests on the ledges of the mold carriage, carrying with it the turn table and mold with the mold with its face downward and is locked in place by means of a suitable catch, and the cover 9 of the tank is closed. The mold carriage, as has been previously stated, being designed to be started from the front of the tank and the rod 104 being moved forward thereby will cause the clutch sleeve 103 to engage the gear 102, the rotatable cylinder or barrel 33 will be in the position it assumes when turned to the right toward the front of the tank and the slidable frame 38 will be in its rearward position. The pump is then started by communicating power to the driving pulley 116 on pump shaft 110, the mixing drum, and endless sprocket chain conveyer and operated through the medium of the pulley 113, the pulley 114 and belt 115. The suction produced by the pump causes the liquid graphite or other conductive coating which has been thoroughly stirred or mixed by the mixing drum or cylinder 15 to be withdrawn from the tank through the pipe 24 and force, through the series of pipes 25, 26, 28, 29, 30, 31 and 32 and through the hollow guides 39 and 40 of the slidable frame 38 into the opposite ends of the rotatable cylinder or barrel 33 and through the double rows of holes 34 and 35 and projected upwardly against the surface of the mold and the indentations therein, the row of holes 34 projecting the conductive coating vertically and the row of holes 35 projecting the conductive coating at an angle of forty five degrees from the vertical. The surplus conductive coating that does not adhere to the mold drops back into the tank by force of gravity and is again stirred and mixed and used over again. As the apparatus operates, the mold carriage and mold move in the opposite direction from the slidable frame 38, by reason of the right and left hand screw portions on the drive shaft which is turning from right to left, and the rotatable cylinder carried thereby, that is to say, as the mold carriage moves toward the rear of the tank, the slidable frame moves toward the front of the tank so that the conductive coating of graphite is applied from the rear to the front of the mold. As the mold carriage and mold move toward the rear of the tank and just before they reach the reversing point, the slidable frame having moved toward the front of the tank, the reversing arm 45 contacts with the pin or lug 40 and the rotatable cylinder or barrel and turns it axially forwardly, which starts the application of the conductive coating of graphite from the rear to the front of the mold.

As has been previously stated, the direction of movement of the mold carriage and mold and the slidable frame 38 are accomplished by the reversal of the turning movement of the drive shaft 54. The direction of movement of said shaft is accomplished by the engagement and disengagement of the clutch sleeve 104 with the bevel gears 101 and 102, said sleeve being operated with the stops 105 and 106 and sliding the rod 104 backward and forward.

To illustrate the various positions that the mold is caused to assume, in applying the conductive coating to all sides of the indentations of the mold and its face, I have lettered the sides of the mold A, B, C and D. As the mold marked A will be in front in the direction of travel and the conductive coating will be projected against the side of the mold marked C, and against the side of the indentations on that side, see Fig. 10, and the operation will continue as shown in the following figures, viz., 11, 12, 13, 14 and 15. In Figs. 8, 9, 10 and 11 the mold makes a quarter turn at each single trip of the carriage both at the front and rear. In Figs. 12 and 13 the mold makes a quarter turn to each round trip of the carriage, from front to rear and back.

If found desirable, the mold carriage and mold could be held stationary and have the conductive coating projector reciprocate thereunder or the conductive coating projector could be held stationary and have the mold carriage and mold reciprocate above the same.

An apparatus, for carrying out the method herein claimed, is claimed in my application for patent filed December 17th, 1912, Serial Number 737281, for apparatus for applying a conductive coating to the surface of a mold used in the art of electrotyping.

What I claim is:—

1. The method of applying a conductive coating to a mold, consisting in inverting the mold and projecting a conductive coating upwardly against the same at such angles with relation to the mold that the face of the mold and each side and bottom of all the indentations therein are coated.

2. The method of applying a conductive coating to a mold, consisting in inverting the mold and projecting a conductive coating against each of the sides and bottoms of the indentations and the face of the mold.

3. The method of applying a conductive coating to an inverted horizontal mold, consisting in projecting a conductive coating in an upward direction against one side of each of the indentations therein and the face of the mold simultaneously.

4. The method of applying a conductive coating to a mold, consisting in inverting the mold, projecting a conductive coating against the mold, rotating the mold intermittently and presenting one side of each of the indentations therein and the face thereof simultaneously to the action of the conductive coating.

5. The method of applying a conductive coating to a mold, consisting in inverting the mold and projecting a conductive coating against the mold in such directions as to coat and polish or burnish the sides of the indentations therein and the face of the mold.

6. The method of applying a conductive coating to a mold, consisting in inverting the mold and projecting streams of a conductive coating against the mold while reciprocating it across the same, and thereby coating and polishing or burnishing the sides and bottoms of the indentations in the said mold and the face thereof.

7. The method of applying a conductive coating to a mold, consisting in projecting a conductive coating successively against the several sides and bottoms of the indentations therein and the face of the mold.

8. The method of coating or applying a conductive coating to the surface of a mold, consisting in inverting the mold and projecting a conductive coating upward against the mold across one surface dimension of the mold and moving it in the direction of the other surface dimension of the mold.

9. The method of applying a conductive coating to a mold, consisting in inverting the mold, projecting a conductive coating upward in different directions and gradually applying it over the entire surface of the mold and each side and bottom of the indentations therein.

10. The method of applying a conductive coating to a mold, consisting in inverting the mold, rotating it step by step and applying a conductive coating thereto by projecting said coating against the indentations of the mold one side at a time.

11. The method of applying a conductive coating to a mold, consisting in inverting the mold and projecting streams of a conductive coating upward against the mold while reciprocating the streams of coating across the same.

12. The method of applying a conductive coating to a mold, consisting in inverting the mold and projecting a conductive coating upward against the mold while reciprocating the same.

13. The method of applying a conductive coating to a mold, consisting in inverting the mold and projecting a conductive coating upward against the mold while reciprocating and rotating said mold.

14. The method of applying a conductive coating to a mold, consisting in inverting the mold and projecting streams of a conductive coating against the mold and changing its angle of projection while reciprocating the said streams of conductive coating across the mold.

15. The method of applying a conductive coating to a mold, consisting in inverting the mold and projecting a conductive coating in two directions against the sides and bottoms of all the indentations of said mold.

16. The method of applying a conductive coating to a mold, consisting in inverting the mold, rotating the mold and projecting a conductive coating in two directions against the said mold.

17. The method of applying a conductive coating to a mold, consisting in inverting and rotating the mold and coating and burnishing the mold and its indentations by projecting a conductive coating against the same.

18. The method of applying a conductive coating to a mold, consisting in inverting the mold and simultaneously projecting a conductive coating against the sides and bottoms of all of the indentations of the same and allowing the removal of the surplus coating.

19. The method of applying a conductive coating to a mold, located in a substantially horizontal plane, consisting in uniformly and gradually applying a conductive coating to the mold by projecting said conductive coating against the sides and bottoms of the indentations of the same and allowing the surplus coating to drop from the mold by gravity.

20. The method of applying a conductive coating to a mold, consisting in taking a mold with an impression in its face, mixing graphite, or other conductive material, with water and projecting said material against each side and bottom of the indentations of the mold and the face thereof, by directing the projected material at different angles with relation to the mold.

In testimony whereof I affix my signature in the presence of two witnesses.

GEORGE E. DUNTON.

Witnesses:
HENRY BECKER,
NETTIE F. FAIRCHILD.